Jan. 23, 1962   R. J. BAGDON   3,017,759
METHOD FOR MAKING FLUID SEALING ELEMENTS
Original Filed July 6, 1956   3 Sheets-Sheet 3

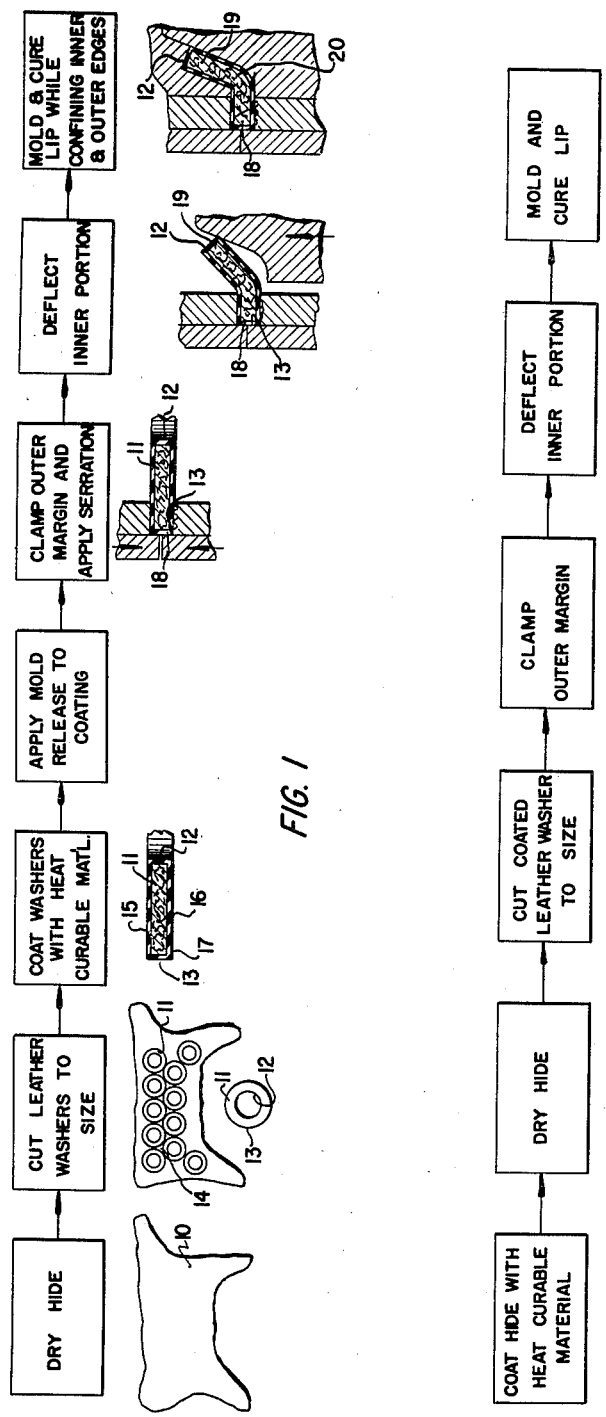

United States Patent Office 3,017,759
Patented Jan. 23, 1962

3,017,759
METHOD FOR MAKING FLUID
SEALING ELEMENTS
Richard J. Bagdon, Los Altos, Calif., assignor to Federal-Mogul-Bower Bearings, Inc., Detroit, Mich., a corporation of Michigan
Original application July 6, 1956, Ser. No. 596,328, now Patent No. 2,990,206, dated June 27, 1961. Divided and this application May 24, 1957, Ser. No. 666,259
9 Claims. (Cl. 69—21)

This invention relates to an improved method for manufacturing fluid seals of the type employing leather or similar material as the sealing element. This application is a division of application Serial Number 596,328, filed July 6, 1956.

One problem in the manufacture of leather oil seals and similar devices, before this invention, was that a large amount of leather was wasted in manufacturing process. Heretofore, a disk of leather was punched from a hide, coated (if desired) with vulcanizable material, and molded into what resembled a hat with a radial rim and a radial crown connected by an axial portion. The sealing element was then obtained by trimming off much of the outer rim, all of the crown and part of the axial connecting portion. All the trimmings from the outer rim were waste, and so were most of the crown trimmings, although it was sometimes possible to use them in the same kind of process for manufacturing seals of smaller diameter than the original ones. In this prior art process, the crown portion was essential because the molding was done by holding the crown tightly and shaping the remainder by drawing in the outer rim. It was never certain how much leather would be drawn in from the outer rim during the molding and therefore it had to be oversize.

An important object of the present invention is to reduce considerably the amount of waste involved in making annular leather sealing elements.

Another object of the invention is to eliminate the steps, heretofore necessary in making leather sealing elements, of drilling a hole through the center of the crown, trimming the outer rim off, trimming off the crown, and sorting the sealing elements from the trimmings.

Another important object of the invention is to provide a revolutionary new process for making annular sealing elements from leather and similar materials. In this process, the annulus that is to become the sealing element may be cut out to size from the flat hide. Then the outer periphery, or flange, is held in its cut shape while the pierce portion is drawn during the molding operation. No further trimming is done. The process involves less waste and fewer steps than any process heretofore used in this field, and it results in a better product.

Another object of the invention is to provide an improved finished product. Leather sealing elements are normally clamped in a case between inner and outer metal case members, that is, between the outer case and either a peripheral edge of an L-shaped inner case or a metal washer which the peripheral edge of the inner case bore against. In either event, the outer case was then turned over the inner case to provide the pressure to hold the leather element tightly, but this very operation also tended to cause misalignment between the inner and outer cases. Misalignment resulted in release of the holding pressure except along the circular line adjacent the peripheral edge of the inner case; so leakage became possible. In the present invention, the leather sealing element is provided with a serrated face that provides a series of line contacts and obtains a better resolution of the holding pressure.

Other objects and advantages of the invention will appear from the following description of a preferred embodiment thereof presented in accordance with 35 USC 112.

In the drawings:
FIG. 1 is a flow sheet illustrating a process embodying the principles of the present invention with diagrammatic sketches further illustrating some of the steps.

FIG. 2 is a flow sheet illustrating a modified process also incorporating the principles of the present invention.

*The method of the present invention*

Figure 3:
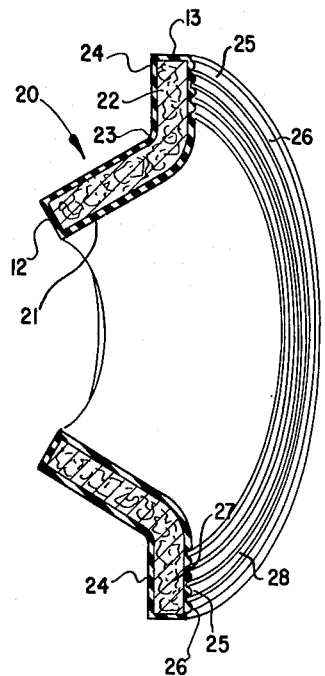
FIG. 3 is an enlarged perspective view in section of a leather sealing element resulting from practice of the method of the invention.

There are several ways to practice the method of this invention. A typical and preferred example will first be described, using leather supplied in the form of hides, as the fibrous material to be molded. The hides 10 are first dried, because I have found that once a hide has been fully dried, a piece cut therefrom regains its original dried shape even if it should subsequently get wet; whereas, if it is not dried, there is no way to assure retention of shape and the inner or outer periphery of a ring cut from the hide might not be accurate enough for the final seat without trimming—and the trimming operation can be eliminated by the present invention.

From the dry hide 10 is cut out a series of leather washers or rings 11, each having an inner periphery 12 and an outer periphery 13. The portion cut out from the inner periphery 12 is still flat and may be used to make seals of smaller sizes, whose outer periphery is the same size as the inner periphery of these washers 11. The main scrap left after cutting the washers 11 from the hide are the portions 14 in between the leather rings 11, which heretofore were much larger because the outer periphery of the leather "hat" used in the prior art had to be larger, and because the necessity of further trimming the outer periphery is eliminated.

The washers 11 are next coated on both surfaces 15, 16 and both peripheral edges 12, 13 with a heat-curable material 17. This material may be a synthetic elastomer or "rubber" composition such as one of those disclosed in Patent No. 2,854,267, or other materials such as various types of heat-curable plastics may be used.

The coated surface of the washer 11 is preferably further treated by applying a small film of a mold release material such as zinc stearate so as to prevent sticking in the mold. Any suitable mold release material may be used in this step.

The next step, as shown in FIG. 1, is to clamp an outer margin or outer annular portion 18 of the coated ring 11 between two parts of the mold. This clamping holds the outer periphery 13 constant and preferably results in serration of one side at least of the portion 18. Then the inner portion 19 is deflected into a frusto-conical shape. After an initial location of this, the exact shape of the final sealing element 20 is obtained between the two halves of the mold, the entire ring being confined during molding, including the inner peripheral edge 12 of the lip portion, to prevent flow of the coating 17. The sealing element 20 is held in this position until the coating 17 is cured, the exact time and temperature depending upon the material being used and upon manufacturer's preferences. With one preferred coating material 17 cure ordinarily takes about 45 seconds at 240° F.

The method of FIG. 1 thus results in a leather sealing element 20 completely coated by cured synthetic rubber 17 and requiring no trimming whatsoever. Such an element 20 is shown in FIG. 3 and will soon be further described.

Alternatively, the method shown in FIG. 2 may be used where it is not necessary or desirable to have the inner and outer peripheral edges 12, 13 of the leather sealing member coated with rubber 17. In this alternative method, the hide 10 itself may be coated with the vulcanizable material before or after the hide has been dried. After coating, the hide 10 is dried, and leather washers 11 are cut as before. After the application of a mold release material to the washers, if desired, their outer marginal portions 18 are clamped in the mold as before. The inner portions 19 are again deflected and, in this instance, the inner and outer edges 12, 13 need not be confined, since there is no flowable material there able to cause irregularities. In this form of the invention there will be no rubber coating on the inner and outer peripheral edges 12, 13.

Further changes in the method may be made; for example, the method applies also to seals made from uncoated leather. In this instance, the coating step is, of course, omitted and so is the vulcanizing step. The provision of heat and pressure still gives a sealing member which will be satisfactory for many uses, although for other uses it is less satisfactory than the coated seal, especially where hot oil is to be sealed in place.

*The product resulting from the invention*

Figure 4:
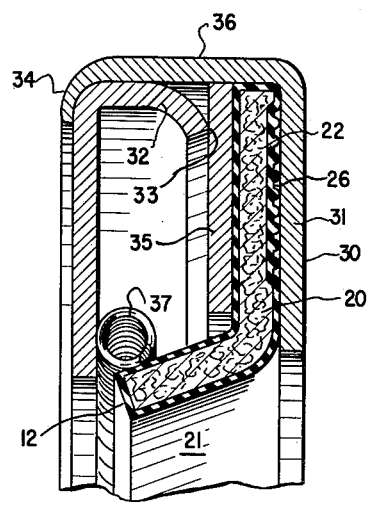
FIG. 4 is an enlarged view in elevation and in section of a finished oil seal wherein the sealing element was made according to the present invention.
Figure 5:
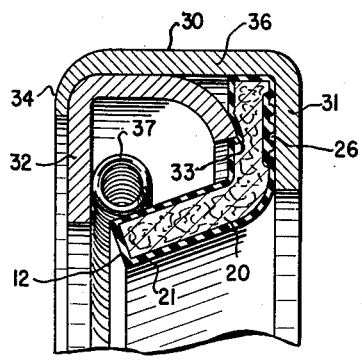
FIG. 5 is a view similar to FIG. 3 of a modified form of oil seal also made according to the present invention.

FIGS. 3, 4 and 5 indicate the product resulting from the invention and claimed in the parent application, Serial Number 596,328, filed July 6, 1956, now U.S. Patent 2,990,206. The leather sealing element 20 (FIG. 3) coated or uncoated, has its inner peripheral edge 12 on a frusto-conical lip 21, and its outer peripheral edge 13 on a flat flange 22, the flange 22 and lip 21 meeting at a corner 23. The flange 22 may have a smooth surface 24 on the side closer to the periphery 12, but the surface 25 on the side opposite the lip 21 shown is preferably provided with serrations 26 formed during the molding operation. These serrations 26 are applied (in a manner soon to be described) before and during molding in order to hold the flange 22 against movement, but they have an equally important and novel function in the final product. For these serrations 26, which consist of a series of concentric depressions 27 between concentric ridges 28, or a spiral groove greatly enhance the ability of the leather element 20 to seal tightly against an outer case 30 (see FIGS. 4 and 5) where they bear against a radial flange 31. The ridges 28 provide a plurality of concentric linear surfaces that concentrate the pressure on the element 20 and assure contact with the flange 31. When or if the outer case 30 is slightly cocked or misaligned relative to an inner case 32, the serrations 26 make it possible for the ridges 28 adjacent the clamping flange 31 to continue to make contact and thereby prevent leaks.

In FIG. 5, the leather sealing element 20 is shown clamped between an outer case 30 and the peripheral edge 33 of the inner case member 32. The inner case 32 is held in the outer case 30 by a turned-over flange 34. In the embodiment shown in FIG. 4, a washer 35 is provided to help distribute the pressure of the inner case 32 against the sealing member 20, but the operation and effect are substantially the same. In both instances, the serrations 26 lie against the inner face of the outer case's radial flange 31, while the outer peripheral edge 13 is preferably snug against an axial flange 36 of the outer case 30. A garter spring 37 holds the lip 21 against the shaft when the seal is installed.

*A preferred apparatus and its application in the method to manufacture the product*

FIGS. 6, 7, 8 and 9 illustrate the molding operation with an apparatus which is preferred in the exercise of the present invention and claimed in copending application, Serial Number 669,906, filed June 6, 1957, now U.S. Patent 3,007,330. The mold has an upper platen 40 and a lower platen 41. A lower plate member 42 is secured to the lower platen 41 by a bolt 43 whose head 44 bears against the upper surface 45 of the lower plate member 42. The surface 45 is provided with a series of spring-receiving depressions 46 located at circumferential intervals on a given radius.

A lower ring member 50 is secured to the lower plate member 42, preferably by a series of bolts 51 with a lost-motion connection so as to be slidable up and down toward and away from the lower plate member 42. For this purpose its upper surface 52 is provided with a series of recesses 53 in which the bolt heads 54 can slide, with a bottom shelf 55 to stop them at a desired point. The lower ring member 50 is also provided with a series of spring-receiving recesses 56 on its lower surface 57, matching the recesses 46, and a series of helical springs 58 are provided for normally urging the two members 42 and 50 apart into the position shown in FIG. 6, but yielding so that they can be pushed into the position shown in FIGS. 8 and 9 where their surfaces 45 and 57 abut.

The lower mold half also includes an inner annular core member 60 whose outer periphery 61 is slidably mounted in a circular bore 62 through the ring 50. The core 60 rests on the lower plate member 42 and is retained thereon by gravity so that no bolts are needed to hold it in place. In other words, the core 60 and lower plate member 42 are stationary with respect to each other and are slidable relative to the lower ring 50.

Figure 6:
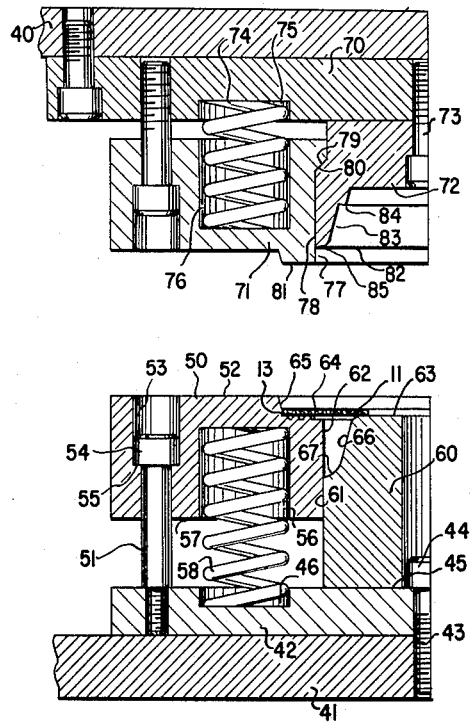
FIG. 6 is a view in elevation and in section of a leather-molding apparatus which may be used in practicing the method of the invention, shown in its open position with a flat leather ring inserted in place before the mold is closed.
Figure 7:
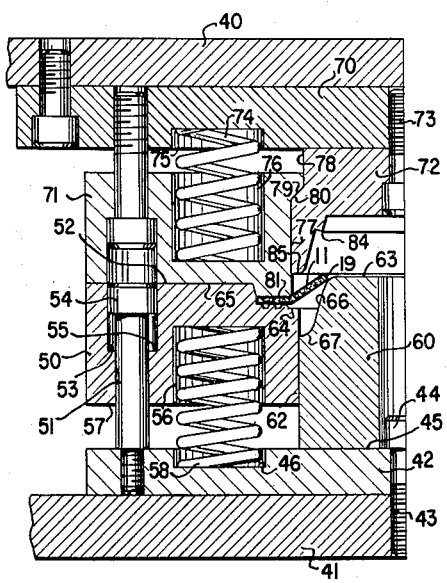
FIG. 7 is a view similar to FIG. 6 with the upper portion of the mold partly closed against the lower portion, and partially depressing a part of the lower portion of the mold so as to deflect upwardly an inner annular portion of the leather ring.
Figure 8:
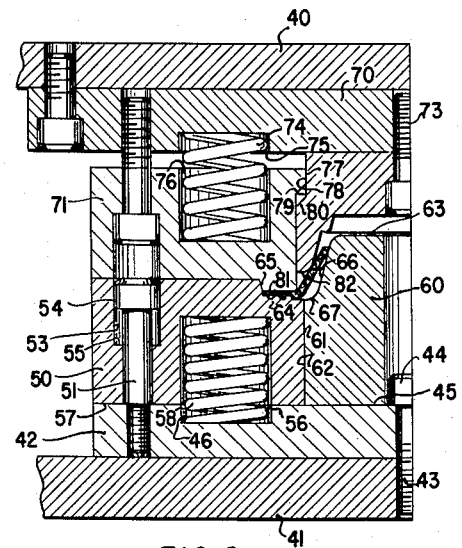
FIG. 8 is a view similar to FIGS. 6 and 7 showing the mold further closed with the spring-supported bottom part fully seated.
Figure 9:
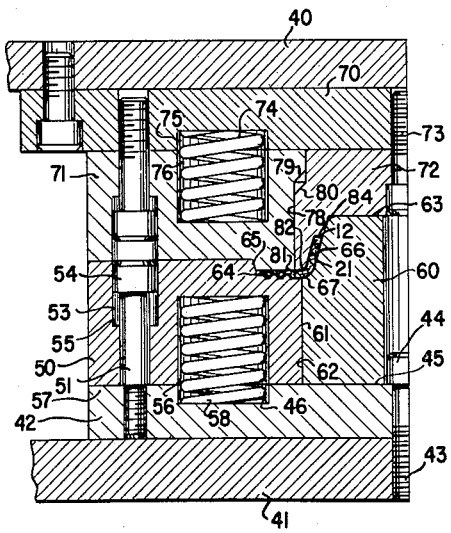
FIG. 9 is a view similar to FIGS. 6, 7 and 8 showing the mold in its fully closed position.

The upper surface 52 of the lower ring and the upper surface 63 of the core member 60 are adapted to receive the leather washer 11, as shown in FIGS. 6 and 7. For this purpose, a shelf 64 and ledge 65 are provided on the lower ring 50, and the shelf 64 is provided with a series of concentric depressions between concentric ridges adapted to form the serrations 26 on the leather washer under the clamping pressure and the vulcanizing. The core member 60 is provided with a generally frustoconical surface portion 66, together with a small tapering radius portion 67 at its base.

The upper half of the mold comprises the upper platen 40, an upper plate member 70, an upper ring 71 spring-mounted to the upper plate member 70 and normally urged away therefrom, and an upper core 72 which is secured to the plate 70 by a bolt 73 and moves therewith. Springs 74 are seated in recesses 75 and 76. The inner periphery 77 of the upper ring 71 and the outer periphery 78 of the core member 72 are preferably provided with coacting stop members 79 and 80 to limit the movement of the ring 71 and core 72 relative to each other. The lower surfaces 81 and 82 of these members are provided with surfaces for engaging and confining the leather element 20 in cooperation with the lower mold, as will be shown in following the process from FIGS. 6 through 9. The core 72 has its surface 82 so constructed as to fully confine the lip portion of the washer by a frustoconical portion 83 and an end ledge 84, and its lower end 85 provides the corner radius 23.

The molding operation

In FIG. 6, the mold is shown in its open position with the leather washer 11 placed therein and resting flat on the shelf 64 and on or, preferably, slightly above the top 63 of the lower core 60. The next step is to lower the upper member so that the lower surface 81 of the upper ring 71 engages the leather washer 11. When this is done, it will be seen from the drawings that further closing of the mold can occur only if one or the other of the upper and lower rings 50, 71 moves. A method of relating the spring pressures is provided so that the lower ring 50 will be the first to move. This may be provided by using heavier springs 74 in the upper member, or it may be provided more simply by using more of the same kind of springs. Thus, if there are three springs 58 in the lower half of the mold, there may be four springs 74 between the upper members 70 and 71; if there are six between the lower members 42 and 50, there may be seven between the upper members 70 and 71.

As shown in FIG. 7, the lower ring 50 is pushed down by the upper mold half, causing a relative movement between the firmly clamped leather washer 11 and the core member 60, which deflects the inner annular portion 19 of the leather washer 11 upwardly. The motion downward continues until the lower surface 57 of the lower ring 50 engages the upper surface 45 of the lower plate 42, the motion thereby being stopped positively in the position shown in FIG. 8. At this time the leather member 11 has been deflected into a generally frusto-conical shape, but as will be seen, it has not yet received its final shape. That is obtained when the upper plate 70 moves down against the pressure of the springs 74 between the upper ring 71 and the upper plate 70. The plate 70 moves until the lower surface of the upper plate 70 engages the upper surface of the upper ring 71, the motion thereby being positively stopped. This is the position shown in FIG. 9, the final position of the mold before and during curing. It will be seen that the upper core member 72 is now in contact with the washer and that the inner peripheral edge 12 of the leather member is confined by the ledge 84. In fact, the whole sealing lip portion 21 of the leather member is confined between the two core members 60 and 72.

The molds are heated, preferably by heating the upper and lower platens 40 and 41 to obtain a temperature of about 240° F. (or whatever curing temperature is desired) in the mold elements themselves. At this temperature, and with a preferable type of synthetic rubber coating, it will take only about 45 seconds for the seal to cure. The cured rubber will retain the leather seal 20 in its molded position indefinitely, and even in the face of pressure to move it in opposite directions.

Thus, a simple and rapid production can be obtained saving time, labor, and material and resulting in a better sealing element.

As already implied, the process is applicable to materials other than leather. The word "leather" has been used as an example of a suitable material, but other fibrous materials or other materials capable of undergoing this process and of giving satisfactory sealing elements may be used in its place. In the claims, too, "leather" as a term is intended to include such equivalent materials.

To those skilled in the art to which this invention relates, many additional changes in construction and widely differing embodiments of the invention will suggest themselves without departing from the spirit and scope of the invention as defined in the claims.

What is claimed is:

1. A method for making a radially flanged frusto-conical annular leather sealing element, comprising the steps of disking out leather washers with concentric inner and outer peripheries; holding the annular radially outer portion of said washer stationary while axially deflecting the unclamped annular radially inner portion into a frusto-conical portion; and applying a force substantially normal to the walls of the frusto-conical portion to compression mold it to a permanent shape.

2. The method of claim 1 wherein said annular radially outer portion of said washer is impressed with serrations before and during said compression molding to retain it against movement during the deflecting and molding steps.

3. A method for making a radially flanged frusto-conical annular leather sealing element coated with synthetic elastomer, comprising the steps of disking out leather washers with concentric inner and outer peripheries, said washers being coated with synthetic elastomer; holding the annular radially outer portion of said washer stationary while axially deflecting the unclamped annular radially inner portion into a frusto-conical portion; compression molding the frusto-conical portion into a permanent shape, and heat curing the elastomer coating.

4. A method for making a radially flanged frusto-conical annular leather sealing element, comprising the steps of (1) drying a leather hide; (2) disking out washers therefrom with concentric inner and outer peripheral edges; (3) coating each washer with a heat curable uncured material; (4) applying thereto a thin film of mold release material; (5) clamping an annular radially outer portion of said washer against a surface having a series of concentric grooves; (6) deflecting the unclamped annular radially inner portion axially into a frusto-conical portion with an inner surface and an outer surface; (7) and applying a force substantially normal to the walls of the frusto-conical portion to compression mold it to a permanent shape, and simultaneously heat-curing the coating.

5. A method for making a radially flanged frusto-conical annular leather sealing element, comprising the steps of (1) drying a leather hide; (2) disking out washers therefrom with concentric inner and outer peripheral edges; (3) coating each washer with a heat-curable uncured material; (4) clamping an annular radially outer portion of said washer tightly; (5) deflecting the unclamped annular radially inner portion axially into a frusto-conical portion with an inner surface and an outer surface and applying a force substantially normal to the walls of the frusto-conical portion to compression mold it to a permanent shape, and simultaneously heat-curing the coating.

6. A method for making a radially flanged frusto-conical annular leather sealing element, comprising the steps of (1) coating a sheet of leather with a heat-curable uncured material; (2) drying the coated sheet; (3) disking out washers therefrom with concentric inner and outer peripheral edges; (4) applying thereto a thin film of mold release material; (5) clamping an annular radially outer portion of said washer against a surface having a series of concentric grooves; (6) deflecting the unclamped annular radially inner portion axially into a frusto-conical portion with an inner surface and an outer surface; and (7) compression-molding the frusto-conical portion while simultaneously curing the coating to give the resulting article a permanent set.

7. A method for making a radially flanged frusto-conical annular leather sealing element, comprising the steps of (1) coating a sheet of leather with a heat-curable uncured material; (2) disking out washers therefrom with concentric inner and outer peripheral edges; (3) clamping an annular radially outer portion of said washer; (4) deflecting the unclamped annular radially inner portion axially into a frusto-conical portion with an inner surface and an outer surface; and (5) compression-molding the frusto-conical portion while simultaneously curing the coating to give the resulting article a permanent set.

8. A method for making a radially flange frustoconical annular leather sealing element, comprising the steps of disking out leather washers with concentric inner and outer peripheries, clamping the annular radially outer portion of said washer while axially deflecting the unclamped annular radially inner portion into a frusto-conical portion, and applying a force substantially normal to the walls of the annular portion and of the frusto-conical portion to compression mold the washer into a radially flanged frusto-conical shape.

9. A method for making a radially flanged frusto-conical annular leather sealing element as defined by claim 8 including the further step of confining the free edge of the frusto-conical portion while applying said force.

References Cited in the file of this patent

UNITED STATES PATENTS

| | | |
|---|---|---|
| 1,699,953 | Conant | Jan. 22, 1929 |
| 1,769,943 | Conant | July 8, 1930 |
| 2,468,616 | Coppola | Apr. 26, 1949 |
| 2,756,795 | Clingman | July 31, 1956 |
| 2,796,634 | Chellis | June 25, 1957 |
| 2,836,972 | Cranker et al. | June 3, 1958 |

FOREIGN PATENTS

| | | |
|---|---|---|
| 18,503 | Great Britain | July 7, 1910 |
| 496,546 | Great Britain | Nov. 28, 1938 |
| 526,552 | Great Britain | Sept. 20, 1940 |